United States Patent [19]
Cobbs

[11] Patent Number: 4,715,293
[45] Date of Patent: Dec. 29, 1987

[54] BODY-SUPPORTED HAND-OPERATED INSTRUMENT DESK

[76] Inventor: Richard W. Cobbs, P.O. Box 609, North Amherst, Mass. 01059

[21] Appl. No.: 939,536

[22] Filed: Dec. 9, 1986

[51] Int. Cl.⁴ ............................................. A47B 23/00
[52] U.S. Cl. ..................................... 108/43; 224/265
[58] Field of Search ................. 108/43; 224/910, 265, 224/266, 270, 210; 248/240

[56] References Cited

U.S. PATENT DOCUMENTS

| | | | |
|---|---|---|---|
| 1,191,425 | 7/1916 | Huddle | 108/43 |
| 1,232,089 | 7/1917 | Riebe | 108/43 |
| 2,304,705 | 12/1942 | Pate | 108/43 X |
| 3,009,613 | 11/1961 | Noland | 108/43 X |
| 3,090,330 | 5/1963 | Best | 108/43 |
| 3,541,976 | 11/1970 | Rozas | 108/43 |
| 4,217,998 | 8/1980 | Alexander | 224/210 X |
| 4,402,441 | 9/1983 | Jones et al. | 224/910 X |
| 4,526,308 | 7/1985 | Dovey | 224/265 |

Primary Examiner—Peter A. Aschenbrenner
Attorney, Agent, or Firm—Albert O. Cota

[57] ABSTRACT

A body-supported hand-operated instrument desk which includes a pair of vertical frame members (20). A table surface is formed by a rectangular member (42) rotatably attached to the frame and a sold or resilient fabric table top (52) is employed to support a hand operated instrument such as a computer. A pair of shoulder straps (36) bridge across the frame allowing the device to be comfortably worn over the shoulders providing a platform that positions the instrument in a convenient location. The invention solves the problem of providing portable access to hand operated instruments heretofore unavailable.

10 Claims, 9 Drawing Figures

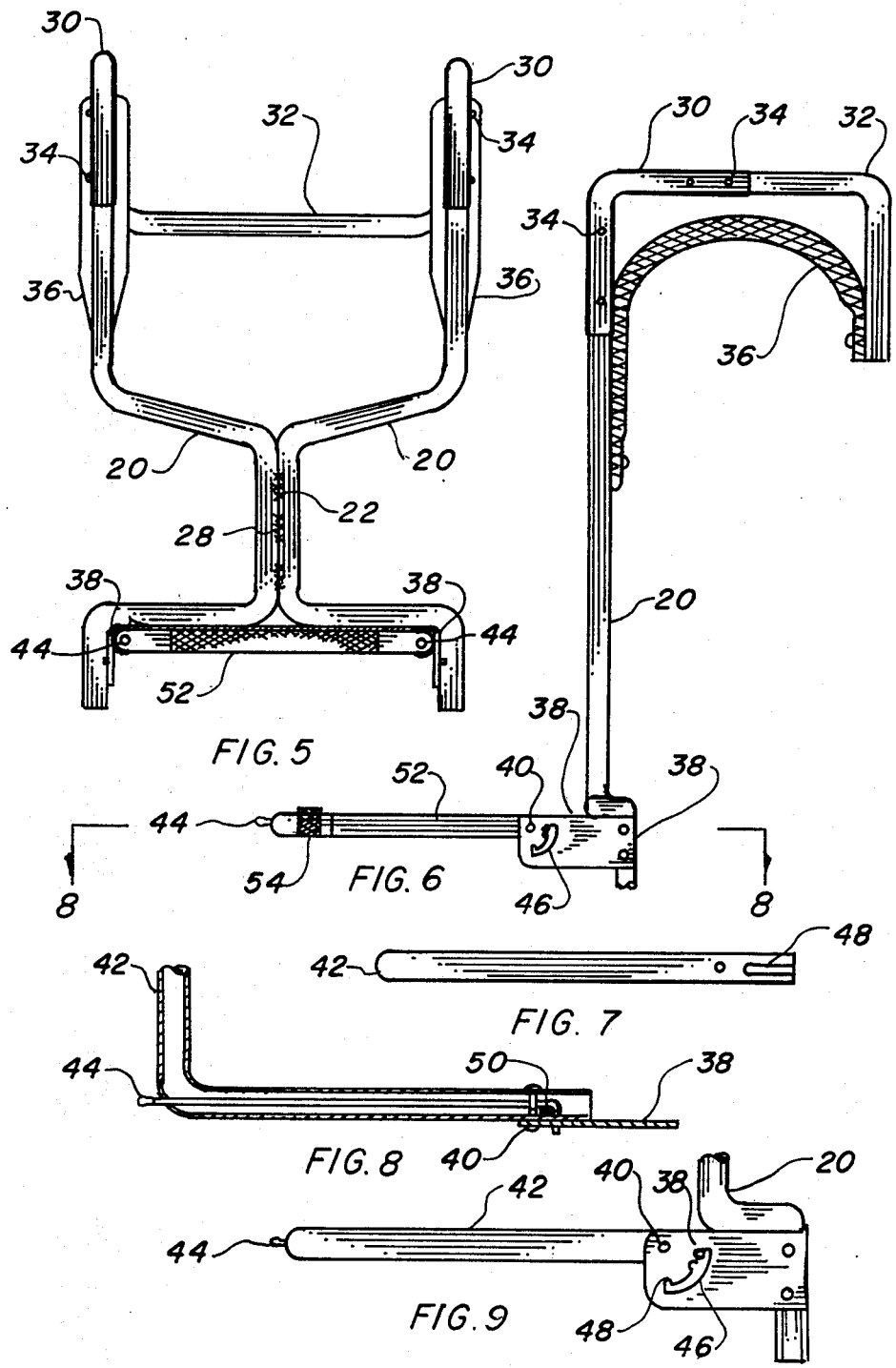

BODY-SUPPORTED HAND-OPERATED INSTRUMENT DESK

TECHNICAL FIELD

The present invention relates to portable human body supported desks in general and more specifically to a hand operated instrument platform retained over the shoulders of ones body for portability and accessibility of the instrument in the field.

BACKGROUND ART

Previously many types of portable body supported platforms have been in use to hold or retain a myriad of objects such as cameras, tree boring drills, food, writing materials and the like. These platforms generally include mounting or attaching to the shoulders or around the neck and some support in the front of ones body. Mechanical frames engaging the shoulders have been used along with flexible straps and rigid table surfaces, however, the combination of a rigid frame with padded straps in cradle form and a fabric enclosed table top and retaining straps is new and useful in the field of portable platforms.

A search of the prior art did not disclose any patents that read directly on the claims of the instant invention however, the following U.S. patents were considered related:

| PATENT NO. | INVENTOR | ISSUED |
| --- | --- | --- |
| 3,934,769 | Carlson, Jr. | 27 January 1976 |
| 3,541,976 | Rozas | 24 November 1970 |
| 3,009,613 | Noland | 21 November 1961 |
| 2,861,854 | Best | 25 November 1958 |
| 2,685,757 | Mirigian | 10 August 1954 |
| 2,603,134 | Burnam | 15 July 1952 |
| 2,566,464 | Redenback | 4 September 1951 |
| 2,547,818 | Gould | 3 April 1951 |

Rozas teaches a support assembly having a rigid support plate and a hinged flat work surface adjustably supported by a leg assembly in the middle of the underside in a diagonal manner. The plate is retained to the body by a pair of straps, one around the neck and the other around the waist. Adjustment allows the work surface to relocated to any size user in the sitting as well as standing position.

Noland utilizes a pair of shoulder arms looping over ones shoulders with a U-shaped base member attaching to the table platform. A pair of fingers hold the platform secure and adjustment is made by rotating a thumb screw onto a projecting ledge on the base member. The platform is free to rotate upwards toward the shoulder arms for storage.

Best employs a pair of hangers that include angular shoulders hooks that are straped together on the upper ends with an adjustable elastic strap. A rigid platform or plate, preferably plastic, is attached to a pair of hinged tubular members. A work holding clamp is rotatably affixed to the plate at one corner and consists of a telescoping arm and adjustable blade or bar on the free end for firmly holding or clamping the work in position on the table.

Burnam applies a pair of shoulder clips that extend through guides at the ends of a breast plate adjustably controlling the level of a camera supporting shelf. A pair of braces hold the shelf at right angles to the breast plate and an adjustable standard locates the shelf vertically relative to the plate.

Another portable platform is taught by Redenback wherein a pair of straps loop over ones shoulders and are connected together at the back with a bridging tie strap. The machinery mounting base is rigid and angular in shape and is adjusted in position by the length of the shoulder straps.

For background purposes and as indictive of the art to which the invention relates reference may be made to the remaining cited patents.

DISCLOSURE OF THE INVENTION

Since the advent of hand held electronic instruments such as portable computers, inventory scanners, calculators handicaping computers for paramutual betting, field surveying instruments and data recording instruments the need has been created to use this technology while in the field where conventional tables, desks and fixed workplaces are unavailable. The instant invention fills this need and it is therefore a primary object of the invention to provide a portable body supported desk for specific hand operated instruments. In todays market this type of instrument is expensive and care must be taken in its handling. Attempting to place the instrument on a stationary surface while in the field creates a potentially hazardous situation. Further, the utility of an instrument, such as a computer that includes an integral keyboard, requires that the location is convenient to ones hands for operation.

An important object of the invention is the comfort in which the table may be worn. In the past, portable platforms have had metallic frame arms that loopingly engage the shoulders which are stiff and rigid or utilize a strap that places all of the weight downward. The apparatus as disclosed incorporates a rigid frame that creates stability with padded shoulder straps cradled therein that place the weight in the optimum location with the hard frame not contacting the shoulders at all. This supported strap arrangement allows even distribution of weight and stabilizes the device in the proper location for manual manipulation of the keyboard or instrument panel.

Another object of the invention in one embodiment includes complete adjustment to the individual body height and shoulder width. This adjustment is easily accomplished using spring loaded detents in mating holes with telescoping sections in both length of the frame and distance over the shoulders. Further the straps are adjustment in length allowing the cradle arrangement to be altered and the angle of the table is easily changed by depressing simultaneously the actuators rods at the front and releasing when the desired angle is achieved.

Another object of the invention allows the utilization of a myriad of hand held instruments without adjustment or alteration. This is accomplished by the use of either a solid or a soft platform of woven fabric stretched between the rigid frame. This arrangement nests the instrument automatically in the center and holds it in place in the cavity around the frame. The size of the table surface is large enough to accept most hand held instruments that include a keyboard or some type of manual adjustment and no minimum envelop is required as the self-centering ability and flexibility of the strapping arrangement is universal in nature.

Yet another object of the invention allows the device to be stored easily with the table top adjusted upwardly to the minimum space requirement and the entire assembly is lightweight and intuitively to use.

These and other objects and advantages of the present invention will become apparent from the subsequent detailed description of the preferred embodiment and the claims taken in conjunction with the accompanying drawings.

BRIEF DESCRIPTION OF THE DRAWINGS

FIG. 5 is a front view of the second embodiment.

FIG. 6 is a side view of the second embodiment.

FIG. 7 is a side view of the C-shaped table member including the angular adjusting means completely removed from the invention for clarity.

FIG. 8 is a cross sectional view taken along lines 8—8 of FIG. 6.

FIG. 9 is a partial view of the apparatus illustrating the angular adjusting bracket as taken in the direction shown in FIG. 4.

BEST MODE FOR CARRYING OUT THE INVENTION

The best mode for carrying out the invention is presented in terms of a preferred and a second embodiment. Both embodiment are primarily designed with little distinction except in the detail structure of the frame. The frame is comprised of a tubular member 20 formed horizontally rising upwardly on each end into a forwardly looping configuration. This portion of the frame 20 conforms to the wearers back and shoulders. The frame 20 continues downward meeting contiguously in the middle and extending outwardly on the same plane as the horizontal portion. The frame 20 is configured to rest on ones shoulders within the loop as retained between the front and the back and the front joins together to allow unrestricted access to the front in the waist area allowing ones forearms to have free access to the frontal area of the invention.

Figures 1, 2:
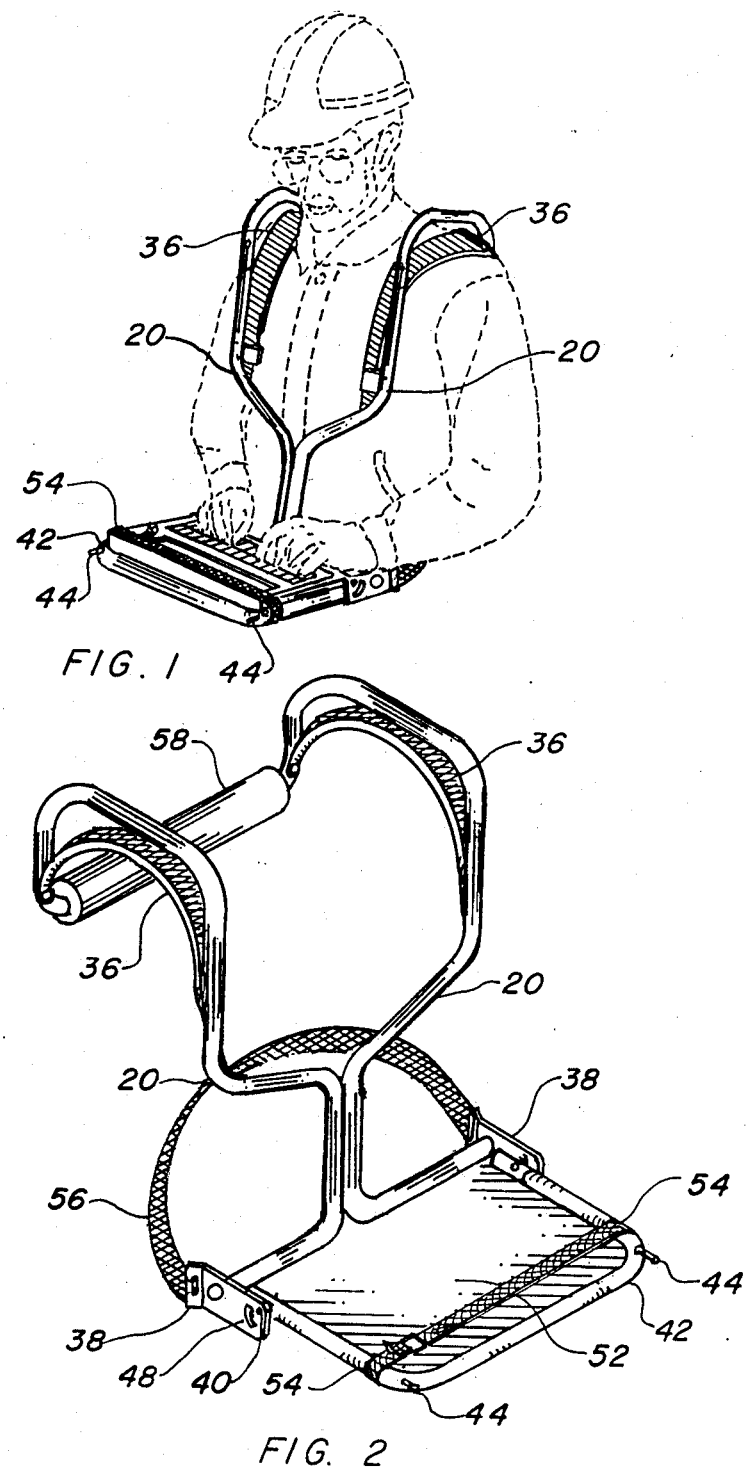
FIG. 1 is a partial isometric view of the preferred embodiment as in use with a person shown pictorially in dashed lines and a computer mounted on the table.
FIG. 2 is a partial isometric view of the apparatus removed from use.

The preferred embodiment of the frame 20 is best depicted in FIGS. 1 and 2 with other details illustrated in FIGS. 7 and 8.

A pair of flat plate brackets 38, each having a slot in crescent shape therein, are attached in a permanent manner to the bottom leg of the vertical frame member 20. These brackets also contain a pivot hole 40 through which a fastener may be attached. The brackets 38 are positioned parallel to the adjustable angular members 30 and form a vertical mounting base in a direction away from the users body. In the preferred embodiment, the frame 20 is attached through the bracket 38 and the second embodiment is attached onto the side with rivets or the like. The brackets 38 may have an offset leg with strap receiving slots as depicted in FIGS. 1 and 2 or be flush with the frame 20 as shown in FIGS. 3, 4, 8 and 9.

A rectangular shaped tubular table member 42 is pivotally disposed, at each end, upon the mounting brackets 38 in a horizontal direction defining an enclosed table area on three sides with the tubular frame members 20 forming the fourth. This arrangement is completed by the use of pivotal fastening means in the form of rivets, threaded fasteners, or the like penetrating both the table member 42 and interfacing through the hole 40 in the bracket 38. The pivoting action allows the angle of the table member 42 to be adjusted in a radial position relative to the horizontal plane. The adjustment means is characterized by a manual actuator providing predetermined angular location setting of the table member 42. This feature is accomplished utilizing a pair of actuating rods 44 having an angular portion on one end bent in the shape of an L. The entire rod 44 is disposed within the tubular table member 42 with the straight end projecting outwardly on the front and the angular end slideably protruding from a slot 46 in the end of the member 42. The protruding angular end of each rod 44 also interfaces with a crescent shaped slot 38 in each bracket 38 and a tension spring 50 attached to the pivoting means of the table member 40 on one end and the angular end of the rod 44 on the other. This spring 50 urges the angular portion of the rod 44 into predetermined locations within the crescent shaped slot of the bracket 38. Adjustment may be made by depressing the projecting ends of the rods 44 against the tension of the spring and rotating the table into the desired position. When the suitable angle is found the rods 44 are released allowing a locking interface to occur with the rod 44 in the crescent shaped slot 48 securing the adjustment.

Figures 3, 4:
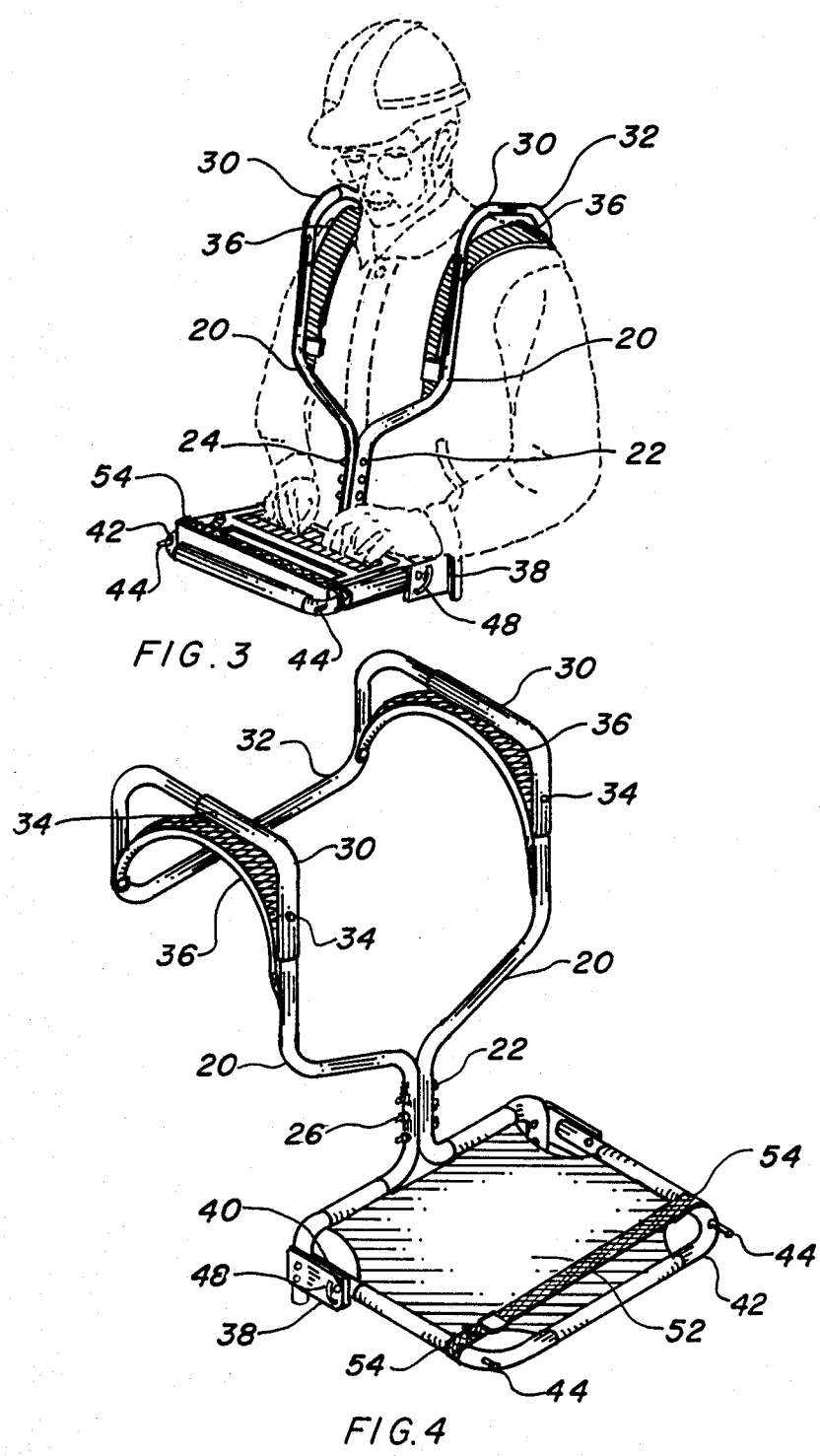
FIG. 3 is a partial isometric view of the second embodiment as in use with a person shown pictorially in dashed lines and a computer mounted on the table.
FIG. 4 is a partial isometric view of the second embodiment removed from use.

The table surface is completed by the use of a rigid or a resilient woven fabric table top 52 that loopingly engages the rectangular shaped table member 42 and portions of the bottom of the vertical frame member 20. The rigid embodiment is illustrated in FIG. 2 and the resilient woven fabric is shown in FIG. 4. This table top 52 is attached on all four sides enclosing the entire area and forms either a hard flat area or a soft pliable surface that conforms readily to the bottom of the instrument and providing natural spaced relationship to the upstanding sides. The top 52 may be of any suitable material such as aluminum or steel in the rigid embodiment and nylon, dacron, cotton or a blend of synthetic fibers or the like in the flexible mode as long as it is pliable and resilient.

A pair of shoulder straps 35 are attached to the frame with one end connected to the vertical frame member 20 and the other to the back support member 32. This arrangement forms a cradle as the straps 36 are shorter than the linear distance of the frame allowing the flexible straps to conform naturally to the individual shoulder contour. This allows the weight of the device to bare evenly on the persons shoulders and as the straps 36 are padded providing added comfort to the user.

For further comfort and to utilize a unitary universal frame 20 a resilient pad 58 is attached to the portion of the frame contiguous with the users back. This pad 58 is comfortable to ones back and is adaptable to various human body structure. The pad 58 may be any shape such as round covering the entire horizontal portion of the frame 20 or may be a soft pliable material with a fabric covering sheath extending to the looping front and attached at each end or along the entire tube with equal ease.

A waistband 56 is attached to the brackets 38 on each end allowing the entire device to be held in contact with the wearer regardless of the movement of ones body. This maintains the position of the table surface relative to the body when movement in the field requires bending over or the like without disrupting use or creating an unstable condition. The band 56 may be any type of strap or so called belly band well known in the art and attachment may be by any means such as hooks, quick release fasteners, snap fasteners, hook and loop tape etc.

As a safety feature retaining straps 54 may be used which are permanently attached on one end to the table member 42 and removably attached on the other. The removable attachment may be made by any number of means well known in the art such as buckles, hooks, snaps, hook and loop tape, mushroom head tape, quick release fasteners and the like. This strapping arrangement is depicted pictorially in FIGS. 1 and 3 juxtapositioned upon the instrument parallel to the front but may also be located diagonally with equal ease. This feature adds to the utility for protection and securement but is not necessary for the ultimate function of the invention.

The basic material of the tubular frame may be any substance suitable for the application having the necessary structural integrity such as steel, magnesium. thermoplastic with aluminum being preferred. As an example, the vertical frame members 20, back support member 32 and table member 42 may be 0.625 inch (1.59 cm) O.D. by 0.049 inch (0.12 cm) thick wall aluminum tube with the angular members 30, being 0.75 inch (1.91 cm) O.D. by 0.058 inch (0.15 cm) thick wall aluminum tube. This material is easily formed and possesses the characteristics of minimum weight and structural asthetic conformability.

The second embodiment, as shown in FIGS. 3 through 9 differs basically in the frame structure which is comprised of a pair of tubular frame members 20. These members 20 are mirror images of each other and have an offset leg on the top and bottom in the shape of a side positioned channel with vertical ends. The two opposed frame members 20 are engaged contiguously in the middle and permanently secured by attaching means 22. This froms a structure the approximate width of a persons shoulders on the top and is slightly larger than an electronic portable instrument on the bottom. The attaching means 22 may be by any method known in the art. The two mating frame members 20 are permanently attached together and form the main structure of the apparatus.

A pair of adjustable angular members 30 having an inside tubular diameter slightly larger than that of the vertical frame member 20 are slidingly disposed over the top offset by such that the height relationship may be altered by sliding the frame inside. This angular member 30 also adds a horizontal direction to the assembly as the protruding leg is at right angles to the frame.

Into these open ended protruding legs of the angular members 30 is a back support tubular frame member 32 is positioned. This back support member 32 is in Ushape with horizontal legs integrally formed at right angles on each end. Their ability to slide inside the angular members 30 provides the structure to mount on top of a persons shoulders and is adjustable in depth.

Locking means in the form of spring loaded detents 34 are positioned within the smaller tubular members. These detents 34 are well known in the art and operate by springing outward against the urging of the integral leaf spring into mating holes in both the outside and inside members. For adjustment the hole protruding portion; or pin actuator, is depressed receiving the entire device inside the tube with the telescoping members then slid in or out as desired until a new hole is in alignment and the pin protrudes therethrough locking the tubes securely in place. This adjustment is accomplished in both height and width allowing a custom fit for each individual using the device.

In use, an instrument such as a computer is placed on the table surface and strapped into place. The frame assembly is adjusted in height and width with the detents 34 in the second embodiment or in either mode, the device is placed over the users shoulders. The final adjustment is made with the shoulders straps 36 and the waist band 56 is fastened making the instrument ready for use.

While the invention has been described in complete detail and pictorially shown in the accompanying drawings it is not to be limited to such details, since many changes and modifications may be made in the invention without departing from the spirit and the scope thereof. Hence, it is described to cover any and all modifications and forms which may come within the language and scope of the claims.

I claim:

1. A body-supported instrument desk retained over the shoulders of ones body for holding a hand operated portable instrument comprising:
   (a) a tubular frame member in generally a U-shape having a middle and ends, formed in such a manner as to conform to the back portion of ones body and over the shoulders with the middle joining contiguously and the ends spread apart, for resting on ones shoulders and providing structure therewith,
   (b) a pair of brackets having slots therein in crescent shape permanently affixed to the ends of said tubular frame member providing a vertical mounting base,
   (c) a rectangular shaped tubular table member having a slot in each end pivotally disposed upon the brackets in a horizontal direction defining an enclosed table area on three sides with the tubular frame member forming the fourth edge of the table member,
   (d) table member manual actuator adjusting means having hand variable adjustment providing predetermined angular displacement of the table member relative to the brackets allowing adjustment of the angle of the table to fit the individuals body and accessibility requirements,
   (e) a table top engaging the table member and bottom vertical frame members providing a support for holding the portable instrument while the desk is retained portably on ones shoulders,
   (f) a pair of shoulder straps attached on one end to the vertical frame members and on the other to the back support member defining a cradle therebetween formably fitting ones shoulders for retaining the weight of the desk evenly thereupon, and
   (g) a resilient pad attached to the frame contiguous with the users back providing a comfortable surface for comfort and adaptability to different body contours.

2. The table member manual actuator means as recited in claim 1 further comprising: a pair of actuating rods having a right angular portion on one end disposed within the tubular table member and projecting therethrough with the angular portion interfacing with the crescent shaped slot in each bracket, and a tension spring connected to the rods and the table member urging the angular portion into a predetermined location within the crescent shaped slot, allowing the adjustment to be made by depressing the projecting ends of the rods against the tension of the spring and rotating the table member into the desired position releasing the rods allowing interface with the crescent shaped slot securing the adjustment.

3. The body supported instrument desk as recited in claim 1 further comprising a plurality of retaining straps permanently attached on one end to one side of the table member and removably attached to the table member on the other holding the instrument engagingly onto the table portion for protection and securement.

4. The instrument supported desk as recited in claim 1 wherein said resilient pad further comprises a soft pliable expanded foam structure completely surrounding said frame.

5. The instrument supported desk as recited in claim 1 wherein said resilient pad further comprises a soft pliable structure covered with a fabric material sheath extending to the looping front portion in contact with the wearers back.

6. The instrument supported desk as recited in claim 1 further comprising: a waistband directed around the users body and attached on each end to said brackets such that the frame is held in contact with the wearer regardless of the angle imposed by body movement.

7. A body-supported instrument desk retained over the shoulders of ones body for holding a hand operated portable instrument comprising:
(a) a pair of tubular vertical frame members having ends and a middle and an offset leg top and bottom in the shape of a side positioned channel with said ends vertical and the middle opposed contiguously therewith,
(b) attaching means securing the frame members permanently together in the middle thereof forming a structure the approximate width of a hand operated portable instrument on the ends,
(c) a pair of tubular adjustable angular members having an inside diameter slightly larger than that of said vertical frame member slidingly disposed over the top offset leg thereof in such a manner as to alter the height relationship to the frame members,
(d) a back support tubular frame member in U-shape with horizontal legs integrally formed at right angles on each end slidingly joined inside the adjustable angular members providing a structure capable of mounting over ones shoulders and being adjusted to fit an individuals body configuration,
(e) locking means within the tubular vertical frame members and back support members interfacing with the angular members such that the assembly is held structurally intact while allowing slideable adjustment therebetween,
(f) a pair of shoulder straps attached on one end to the vertical frame members and on the other to the back support member defining a cradle therebetween formably fitting ones shoulders for retaining the weight of the desk evenly thereupon,
(g) a pair of brackets having crescent shaped slots therein permanently affixed to the bottom offset leg of each vertical frame member providing a vertical mounting base,
(h) a rectangular shaped tubular table member having a slot in each end pivotally disposed upon the brackets defining an enclosed table area on three sides with the tubular frame member forming the fourth edge of the table member,
(i) table member adjusting means characterized by a manual actuator providing predetermined angular displacement of the table member relative to the brackets allowing adjustment of the angle of the table to fit the individuals body and accessibility requirements, and
(j) a table top engaging the table member and bottom vertical frame members providing a support for holding the portable instrument while the desk is retained portably on ones shoulders.

8. The locking means as recited in claim 7 further comprising a plurality of spring loaded detents within the tubular members urged outwardly under the influence on the spring providing a locking structure with each tubular member having a mating hole through which the detents protrude.

9. The table member manual actuator adjusting means as recited in claim 7 further comprising: a pair of actuating rods having a right angular portion on one end disposed within the tubular table member and projecting therethrough with the angular portion interfacing with the crescent shaped slot in each bracket, and a tension spring connected to the rods and the table member urging the angular portion into a predetermined location within the crescent shaped slot, allowing the adjustment to be made by depressing the projecting ends of the rods against the tension of the spring and rotating the table member into the desired position releasing the rods allowing interface with the crescent shaped slot securing the adjustment.

* * * * *